United States Patent
Shin et al.

Patent Number: 6,086,443
Date of Patent: Jul. 11, 2000

[54] LIQUID CRYSTAL DISPLAYS AND MANUFACTURING METHODS THEREOF

[75] Inventors: Ki-Chul Shin; Sung-Uk Jung, both of Seoul; Bum-Su Kim, Kyungki-do, all of Rep. of Korea

[73] Assignee: Samsung Electronics Co., Ltd., Rep. of Korea

[21] Appl. No.: 09/080,449

[22] Filed: May 18, 1998

[30] Foreign Application Priority Data

May 16, 1997 [KR] Rep. of Korea ........................ 97-18973

[51] Int. Cl.$^7$ .................................................. G02F 1/1339
[52] U.S. Cl. ............................ 445/25; 349/189; 349/190
[58] Field of Search .............................. 445/25; 349/189, 349/190

[56] References Cited

U.S. PATENT DOCUMENTS

| | | | |
|---|---|---|---|
| 5,137,484 | 8/1992 | Bohannon | 445/25 |
| 5,828,435 | 10/1998 | Kato et al. | 349/190 |

FOREIGN PATENT DOCUMENTS

| | | |
|---|---|---|
| 7-318953 | 12/1995 | Japan . |
| 7-318957 | 12/1995 | Japan . |

*Primary Examiner*—Kenneth J. Ramsey
*Attorney, Agent, or Firm*—Myers Bigel Sibley & Sajovec, P.A.

[57] ABSTRACT

Liquid crystal displays are manufactured by securing overlying first and second substrates with an intermediate sealant together such that they form a cell cavity with an injection opening. In one embodiment, a plurality of over-sized spacers are disposed intermediate the first and second substrates in the cell cavity. The first and second substrates are structurally secured by heat compressing the layers together with a pressure in the range of about 0.4–0.55 kg/cm$^2$. A quantity of liquid crystal material is injected into the cell cavity through the injection opening to expand the substrate layers to a non-planar configuration. A second sealant is applied proximate to the injection opening and a second compressing step is used to facilitate the proper positioning of the second sealant into injection opening. The second compressing step employs a pressure about 0.1–1.0 kg/cm$^2$ greater than the pressure in the first compressing step. In one embodiment, the second compressing step is delayed by about 3–20 hours after the injecting step. In another embodiment, the over-sized spacers arc sized such that they are 10–30% larger than the cell cavity gap. The liquid crystal display includes first and second substrate layers and a first sealant which define a cell cavity and spacers in the cell cavity which are compressed by about 10–30% relative to their uncompressed configurations.

38 Claims, 15 Drawing Sheets

FIG. 9

| positions NO | 1 | 2 | 3 | 4 | 5 | 6 | 7 | 8 | 9 | 10 | 11 | 12 | 13 | 14 | 15 | 16 | 17 | AVE'C | MAX | MIN | MAX−MIN | STD |
|---|---|---|---|---|---|---|---|---|---|---|---|---|---|---|---|---|---|---|---|---|---|---|
| # 1 | 4.48 | 4.39 | 4.48 | 4.50 | 4.43 | 4.33 | 4.21 | 4.46 | 4.28 | 4.27 | 4.44 | 4.48 | 4.42 | 4.56 | | | | 4.41 | 4.56 | 4.21 | 0.35 | 0.1035 |
| AVE1 | 4.42 | | | | | | 4.27 | | | | | | 4.49 | | | | | 4.40 | 4.53 | 4.22 | 0.31 | 0.0863 |
| # 2 | 4.47 | 4.37 | 4.41 | 4.40 | 4.39 | 4.36 | 4.27 | 4.52 | 4.51 | 4.22 | 4.34 | 4.32 | 4.41 | 4.53 | 4.49 | 4.42 | 4.42 | | | | | |
| AVE2 | 4.41 | | | | | | 4.29 | | | | | | 4.45 | | | | | 4.41 | 4.54 | 4.24 | 0.30 | 0.0904 |
| AVE | 4.48 | 4.38 | 4.45 | 4.45 | 4.41 | 4.35 | 4.24 | 4.49 | 4.49 | 4.25 | 4.31 | 4.30 | 4.43 | 4.54 | 4.49 | 4.42 | 4.49 | | | | | |
| | 4.41 | | | | | | 4.28 | | | | | | 4.47 | | | | | | | | | |

FIG.12

| positions NO | 1 | 2 | 3 | 4 | 5 | 6 | 7 | 8 | 9 | 10 | 11 | 12 | 13 | 14 | 15 | 16 | 17 | AVE'G | MAX | MIN | MAX-MIN | STD |
|---|---|---|---|---|---|---|---|---|---|---|---|---|---|---|---|---|---|---|---|---|---|---|
| # 3 | 4.45 | 4.48 | 4.51 | 4.48 | 4.48 | 4.45 | 4.47 | 4.57 | 4.48 | 4.51 | 4.47 | 4.44 | 4.42 | 4.45 | 4.43 | 4.45 | 4.40 | 4.47 | 4.57 | 4.40 | 0.17 | 0.0395 |
| AVE3 | | | | | 4.49 | | | | | | | | 4.45 | | | | | | | | | |
| # 4 | 4.49 | 4.52 | 4.51 | 4.54 | 4.46 | 4.51 | 4.50 | 4.48 | 4.42 | 4.47 | 4.46 | 4.45 | 4.45 | 4.46 | 4.46 | 4.48 | 4.39 | 4.47 | 4.54 | 4.39 | 0.15 | 0.0371 |
| AVE4 | | | | | 4.50 | | | | | | | | 4.45 | | | | | | | | | |

FIG.14

| positions NO | 1 | 2 | 3 | 4 | 5 | 6 | 7 | 8 | 9 | 10 | 11 | 12 | 13 | 14 | 15 | 16 | 17 | MIN | MAX | AVE | MAX-MIN | STD |
|---|---|---|---|---|---|---|---|---|---|---|---|---|---|---|---|---|---|---|---|---|---|---|
| # 5 | 4.57 | 4.47 | 4.41 | 4.46 | 4.31 | 4.51 | 4.39 | 4.63 | 4.61 | 4.39 | 4.40 | 4.36 | 4.37 | 4.35 | 4.29 | 4.23 | 4.25 | 4.23 | 4.63 | 4.41 | 0.40 | 0.118 |
| # 6 | 4.55 | 4.53 | 4.52 | 4.46 | 4.50 | 4.51 | 4.54 | 4.48 | 4.53 | 4.54 | 4.49 | 4.52 | 4.49 | 4.54 | 4.48 | 4.48 | 4.46 | 4.46 | 4.55 | 4.51 | 0.09 | 0.029 |

FIG.16

| positions NO | 1 | 2 | 3 | 4 | 5 | 6 | 7 | 8 | 9 | 10 | 11 | 12 | 13 | 14 | 15 | 16 | 17 | AVE'G | MAX | MIN | MAX−MIN | STD |
|---|---|---|---|---|---|---|---|---|---|---|---|---|---|---|---|---|---|---|---|---|---|---|
| # 7 | 4.31 | 4.30 | 4.28 | 4.29 | 4.26 | 4.19 | 4.25 | 4.26 | 4.23 | 4.24 | 4.33 | 4.28 | 4.24 | 4.18 | 4.24 | 4.23 | 4.26 | 4.27 | 4.33 | 4.18 | 0.15 | 0.0400 |
| AVE | | | | | | | | | | | | | | | | | | 4.27 | | | | |
| # 8 | 4.25 | 4.32 | 4.33 | 4.25 | 4.30 | 4.23 | 4.21 | 4.24 | 4.25 | 4.28 | 4.22 | 4.24 | 4.13 | 4.22 | 4.26 | | | 4.24 | 4.33 | 4.13 | 0.20 | 0.0469 |
| AVE | | | | | | | | | | | | | | | | | | 4.24 | | | | |
| # 9 | 4.26 | 4.26 | 4.33 | 4.26 | 4.30 | 4.24 | 4.26 | 4.21 | 4.24 | 4.25 | 4.28 | 4.22 | 4.22 | 4.17 | 4.18 | 4.25 | 4.22 | 4.25 | 4.33 | 4.17 | 0.16 | 0.0412 |
| AVE | | | | | | | | | | | | | | | | | | 4.23 | | | | |
| # 10 | 4.36 | 4.39 | 4.42 | 4.34 | 4.34 | 4.29 | 4.35 | 4.33 | 4.30 | 4.35 | 4.39 | 4.37 | 4.32 | 4.26 | 4.30 | 4.31 | | 4.34 | 4.42 | 4.26 | 0.16 | 0.0409 |
| AVE | | | | | | | | | | | | | | | | | | 4.32 | | | | |
| # 11 | 4.28 | 4.32 | 4.38 | 4.31 | 4.29 | 4.25 | 4.28 | 4.29 | 4.27 | 4.30 | 4.35 | 4.28 | 4.29 | 4.24 | 4.20 | 4.24 | 4.24 | 4.28 | 4.38 | 4.20 | 0.18 | 0.0434 |
| AVE | | | | | | | | | | | | | | | | | | 4.27 | | | | |

FIG.18

| positions NO | 1 | 2 | 3 | 4 | 5 | 6 | 7 | 8 | 9 | 10 | 11 | 12 | 13 | 14 | 15 | 16 | 17 | MIN | MAX | AVE | MAX-MIN | STD |
|---|---|---|---|---|---|---|---|---|---|---|---|---|---|---|---|---|---|---|---|---|---|---|
| #12 | 4.43 | 4.34 | 4.25 | 4.25 | 4.21 | 4.36 | 4.21 | 4.39 | 4.41 | 4.28 | 4.24 | 4.25 | 4.26 | 4.25 | 4.26 | 4.28 | 4.28 | 4.21 | 4.43 | 4.29 | 0.22 | 0.069 |
| #13 | 4.29 | 4.35 | 4.35 | 4.29 | 4.37 | 4.29 | 4.36 | 4.35 | 4.30 | 4.34 | 4.39 | 4.32 | 4.26 | 4.31 | 4.29 | 4.30 | 4.22 | 4.22 | 4.39 | 4.32 | 0.17 | 0.043 |

LIQUID CRYSTAL DISPLAYS AND MANUFACTURING METHODS THEREOF

FIELD OF THE INVENTION

The present invention relates to liquid crystal displays and manufacturing methods thereof.

DESCRIPTION OF THE RELATED ART

In general, a liquid crystal display (LCD) has two substrates having electrodes and a liquid crystal layer between the two substrates, and the substrates are combined by a sealant.

As the size of the liquid crystal display becomes large, it is important to make the gap between the two substrates, which is called the cell gap, to be uniform. Here, the cell gap alternately means the size of the cell gap in the specification.

To obtain the uniform cell gap, spacers are dispersed or supporting bars are formed between the substrates in a display region having a plurality of pixels.

A conventional LCD is described below with reference to FIG. 1 which is a cross-sectional view of a conventional LCD.

As shown in FIG. 1, a liquid crystal layer 5 is located in a cell gap between two substrates 1 and 2 parallel to each other. Spacers 4 included in the liquid crystal layer 5 support the substrates 1 and 2 to maintain the cell gap. The liquid crystal layer 5 is sealed by a sealant 3 which is printed on the inner surfaces of the substrates 1 and 2 near the edges of substrates 1 and 2.

A manufacturing method of the above-described LCD is described below.

First, electrodes (not shown) are formed on the inner surface(s) one (or both) of two substrates 1 and 2, and spacers 4 are dispersed on the inner surface of one of the substrates 1 and 2. A sealant 3 having an injection hold (not shown) is printed on the inner surface of one of the substrates 1 and 2 near the edge of the substrate 1 or 2. Next, the two substrates 1 and 2 are combined with each other through hot press process, and the spacers 4 give a cell gap between the substrates 1 and 2. A liquid crystal material is injected into the cell gap through the injection hold to form a liquid crystal layer 5. Finally, a liquid crystal cell is completed by filling up the injection hole with a sealant.

At this time, the pressures in the hot press process and in end seal process for filling up the injection hole, which are exerted on the substrates 1 and 2, are nearly 0.6 kg f/cm$^2$ and 0.5 kg f/cm$^2$, respectively.

However, the conventional LCD manufactured by using the method may have several spots resulted from the non-uniform distribution of spacers, and may have a non-uniform cell gap. Furthermore, a stain of the half-moon shape is generated near the injection hold of the conventional LCD.

OBJECTS AND SUMMARY OF THE INVENTION

An object of the present invention is to eliminate spots in an LCD, and another object is to obtain the uniform cell gap of a liquid crystal display.

In the manufacturing of LCD according to this invention, the pressure during filling up an injection hold with a sealant is stronger than the pressure in the hot press step for combining two substrates using a sealant.

It is preferable that the pressure during filling up the injection hole is stronger than the pressure in the hot press step by 0.1–1.0 kg f/cm$^2$.

The hot press step is performed by applying pressure preferably in the range of 0.4–0.55 kg f/cm$^2$.

The diameter of spacers between the substrates is preferably larger than the goal cell gap by 10–30%.

The combined substrates of the liquid crystal cell are preferably left for 3–20 hours between the steps of injecting the liquid crystal material into liquid crystal cell and filling up the injection hole.

In manufacturing method of the LCD according to the present invention, the cell gap of the liquid crystal display becomes uniform by exerting the pressure during filling up the injection hole larger than the pressure in the hot press step and/or spreading spacers having the diameter larger than the goal cell gap of the liquid crystal display. Furthermore, the cell gap of the liquid crystal display becomes uniform and the stain near the injection hole is eliminated for leaving enough before filling up the injection hole.

These and other objects of the present invention are satisfied by the present invention which is directed toward improved methods of manufacturing an LCD. More particularly, a first aspect of the invention is a method which positions a first substrate layer having inner and outer surfaces to overlay an opposing second substrate layer having inner and outer surfaces. The first and second substrate layer inner surfaces face each other and each of the inner surfaces include a perimeter portion therearound. A first sealant is applied to at least one of the perimeter portions of the first and second substrate layers such that the sealant forms an injection opening along the perimeter portion. The outer surfaces of the substrates are compressed after the applying step at a first pressure to structurally attach the sealant and substrates together such that they define a cell cavity therebetween. Liquid crystal is injected through the injection opening into the cell cavity at a pressure sufficient to expand the cell such that the first and second substrate layers take a non-planar configuration. The first and second substrate layers are compressed to a substantially planar configuration thereby expelling a residual amount of the injected liquid crystal material from the cell cavity out of the injection opening. A second sealant is applied proximate to the injection opening to position sealant material for an end seal there at. The first and second substrates are then compressed at a second pressure which is greater than the first pressure of in the first compressing step. Preferably, the method also includes delaying the second sealing by about 3–20 (or more preferably 3–10) hours after the injecting step.

In a preferred embodiment, the second compression step includes compressing the substrate layers by gradually increasing the external pressure from an initial end seal pressure (P1) to a second end seal pressure (P2) during a first time period (T1) and maintaining the second seal pressure (P2) for a second time period (T2). It is also preferred that P2 is less than the first pressure introduced during the first compressing step.

In another fabrication method according to the instant invention, similar to the one described above, a method of forming a cell gap in a liquid crystal display comprises the steps of applying a first sealant to an outer perimeter portion of a first substrate layer such that the first sealant forms an injection opening. The second substrate is positioned to overlay the first substrate layer and first sealant. A plurality of spacers is disposed on at least one of the first and second substrates. The first and second substrate layers are compressed toward each other with an external force and heat to structurally attach the substrates together, thereby forming a cell cavity defined by the first substrate, the first sealant, and the second substrate. A second sealant is applied proximate to the injection opening and a second pressure is introduced onto the first and second substrates to position the second sealant such that it travels into the injection opening. The second pressure is about 0.1–1.0 kg/cm$^2$ greater than the first pressure. The second sealant is cured to seal the cell cavity. Preferably, the spacers have a diameter which is greater than the sealed width of the cell cavity.

Yet another aspect of the present invention is a method for fabricating a liquid crystal display, comprising the steps of applying a first sealant on at least one of a first and second substrate and hot-pressing the first and second substrates together such that the first sealant is intermediate the first and second substrates. The first and second substrates and sealant attach to form a cell cavity with an injection opening therebetween. A quantity of liquid crystal material is injected into the cell cavity through the injection opening. The injection opening is sealed with a second sealant by introducing a second pressure onto the first and second substrates thereby facilitating the proper positioning of the second sealant such that it enters and closes the injection opening. The second pressure is not directly introduced onto the first and second substrates, but is delayed by about 3–20 hours after the injecting step.

Similarly, another method of the instant invention comprises applying a first sealant to form a continuous trail along an outer perimeter portion at least one of a first and second substrate, the trail having an injection opening formed therealong. A plurality of spacers is disposed on at least one of the first and second substrates such that they reside inside the perimeter area defined by the sealant trail. The substrates are secured together with the first sealant to define a cell cavity with internally positioned spacers. A quantity of liquid crystal display material is injected into the injection opening and a second sealant is applied to the injection opening after the injecting step. The first and second substrates are forced to compress the spacers such that they deform by about 10–30% from their static configuration.

An additional aspect of the present invention is directed toward a liquid crystal display. The liquid crystal display includes a first substrate layer and a second substrate layer positioned opposing the first substrate layer. The first and second substrates are structurally connected such that they define a cell cavity therebetween. A liquid crystal layer is positioned intermediate the first and second substrate layers. A plurality of compressed spacers are positioned in the cell cavity such that they contact the first and second substrates. The compressed spacers are sized and configured such that they are compressed in the cell cavity by about 10–30% relative to their uncompressed configurations.

BRIEF DESCRIPTION OF THE DRAWINGS

The preferred embodiment of the present invention will now be described more specifically with reference to the attached drawings, wherein:

FIG. 9 and FIG. 10 are a table and a graph showing the gaps measured in the first experiment;

FIG. 12 and FIG. 13 are a table and a graph showing the gaps measured in the second experiment;

FIG. 14 and FIG. 15 are a table and a graph showing the gaps measured in the third experiment;

FIG. 16 and FIG. 17 are a table and a graph showing the gaps measured in the fourth experiment; and FIG. 18 and FIG. 19 are a table and a graph showing the gaps measured in the fifth experiment.

DETAILED DESCRIPTION OF PREFERRED EMBODIMENTS

Preferred embodiments of the present invention are described below with reference to the accompanying drawings.

Figure 1:
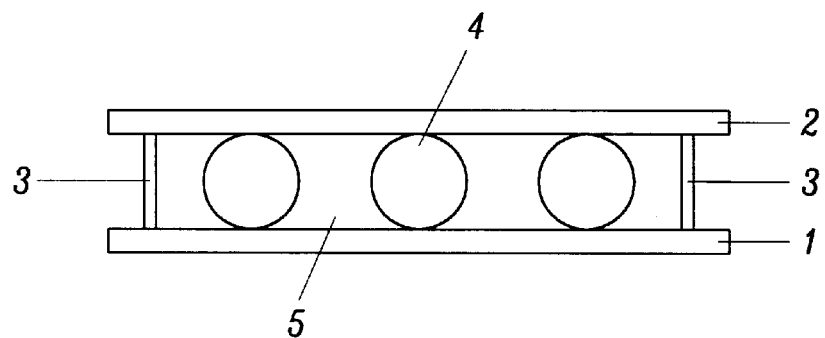
FIG. 1 is a cross-sectional view of a conventional LCD.
Figure 2:
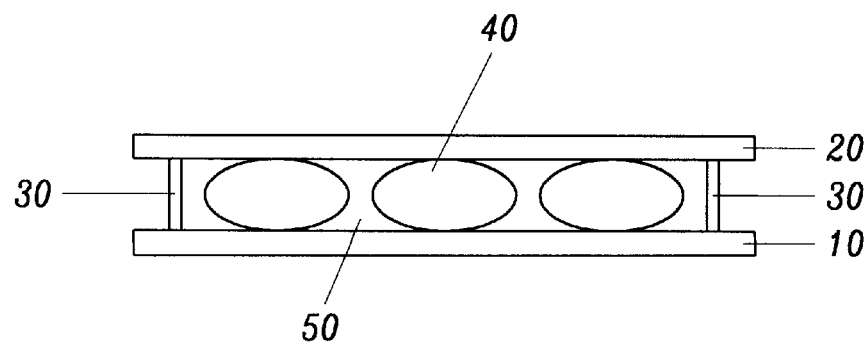
FIG. 2 is a cross-sectional view of an LCD according to an embodiment of the present invention.

FIG. 2 is a cross sectional view of an LCD according to an embodiment of the present invention.

As shown in FIG. 2, a liquid crystal layer 50 is inserted in a gap between two substrates 10 and 20 parallel to each other. Spacers 40, which are included in the liquid layer 50 and are spherical-shaped, support the substrates 10 and 20 to be parallel to each other. The liquid crystal layer 50 is sealed by a sealant 30 which is printed on the inner surface of one of the substrates 10 and 20 near the edge of the substrates 10 and 20.

In this embodiment of the present invention, the diameter of spacers 40 is larger than the cell gap between the substrates 10 and 20 by 10–30%, and thus the spacers 40 in the cell gap are compressed down compared with its uncompressed state by 10–30%.

A manufacturing method of the LCD according to the present invention is described below.

Figure 3:
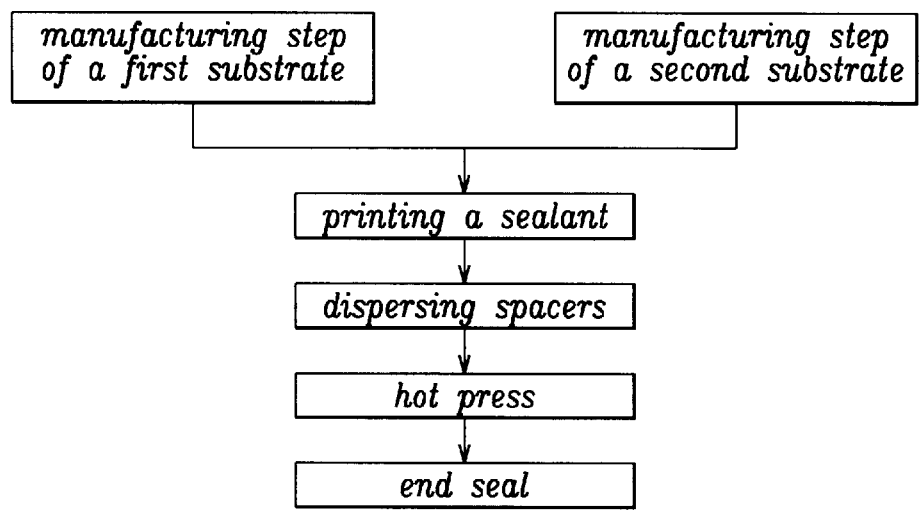
FIG. 3 is a flow chart illustrating a manufacturing method of an LCD according to an embodiment of the present invention.
Figure 4:
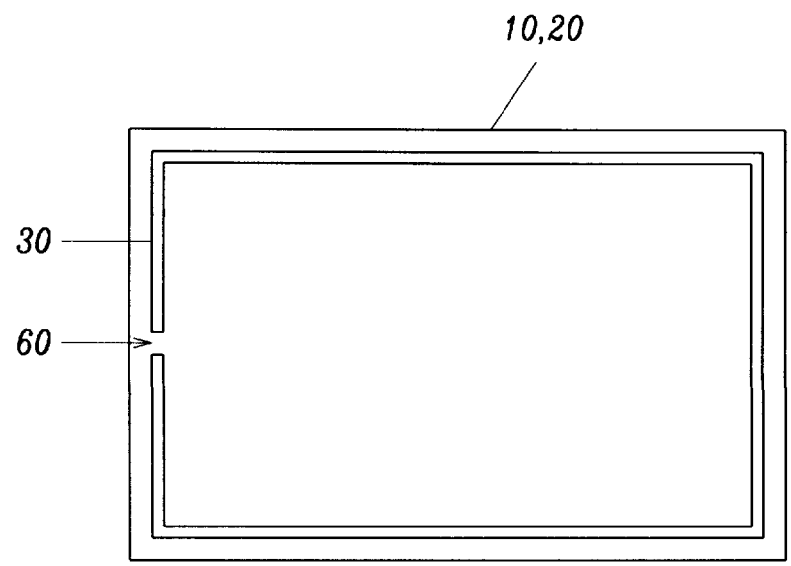
FIG. 4 is a plan view of an LCD according to an embodiment of the present invention.
Figure 6:
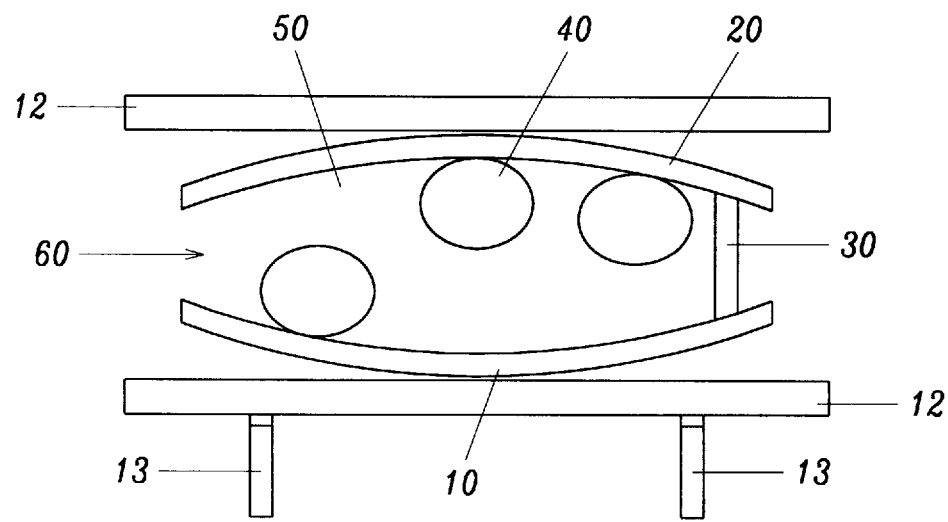
FIG. 6 is a cross-sectional view of an LCD during end seal step.
Figure 7:
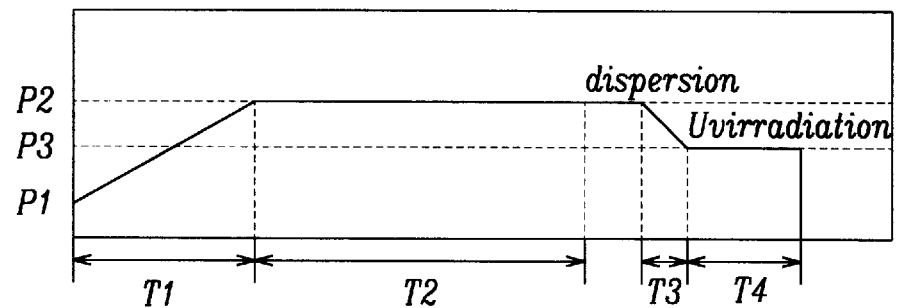
FIG. 7 is a timing chart illustrating end seal step.

FIG. 3 is a flow chart illustrating a manufacturing method of an LCD according to an embodiment of the present invention. FIG. 4 is a plan view of an LCD according to an embodiment of the present invention, FIG. 5 is a cross-sectional view of an LCD during hot press step, FIG. 6 is a cross-sectional view of an LCD during end seal step, and FIG. 7 is a timing chart of an end seal step.

Referring to FIGS. 2, 3 and 4, in the manufacturing step of a first substrate and a second substrate, electrodes (not shown) are formed on one or both of the substrates 10 and 20, respectively. A sealant 30 having an injection hole 60 is printed on the inner surface of one of the substrates 10 and 20 near the edge of the substrates 10 and 20, and spacers 40 are dispersed thereon.

The diameter of the spacers 40 may be larger than the goal cell gap between the substrates 10 and 20 by 10–30%, and the spacers 40 are spherical or cylindrical.

Figure 5:
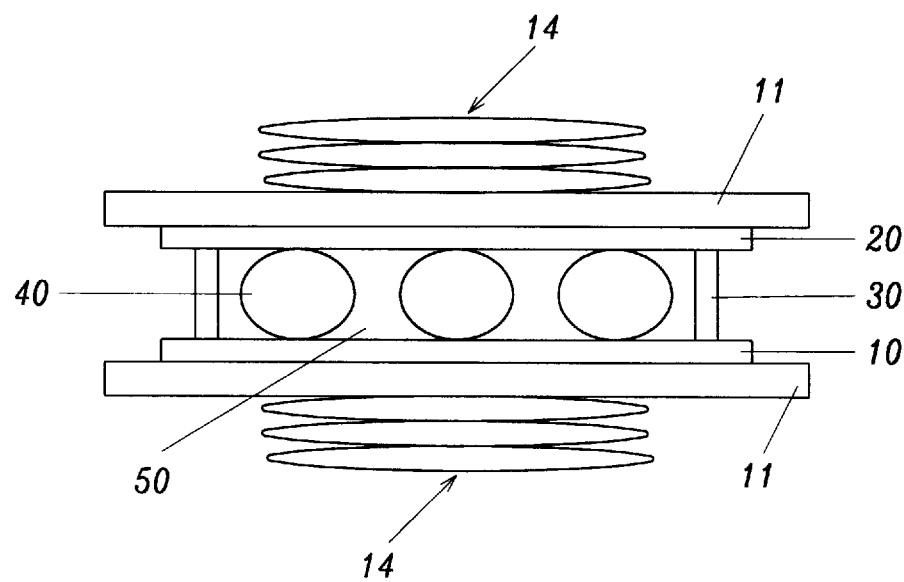
FIG. 5 is a cross-sectional view of an LCD during hot press step.

As shown in FIG. 5, in hot press step, the two substrates 10 and 20 are aligned with each other. Next, the outer surfaces of the substrates 10 and 20 are pushed by the press plates 11 which is connected to a press system 14. The substrates are applied with uniform pressure and heat, and then the sealant 30 become hardened to combine the substrates 10 and 20.

At this time, the spacers 40 are deformed by the applied pressure from the press plates 11.

In the meantime, if the pressure in the hot press step is P (kg g/cm$^2$), the compressive strain of the spacers 40 is S ($\mu$m/gf) and the number of the spacers 40 in a unit area is N (ea/ mm$^2$), the deviation of the cell gap $\Delta$D is proportional to P·S (1/N$_{min}$–1/N$_{max}$ where N$_{min}$ and N$_{max}$ mean the minimum and the maximum numbers of the spacers dispersed in unit square, respectively.

According to this proportionality, the smaller the pressure in the hot press step becomes, the smaller the deviation of the cell gap becomes.

However, if the pressure in the hot press step is too small, the uniformity of the cell gap may decrease, because the bend of the substrates themselves may not be completely eliminated. Therefore, the pressure in the hot press step enough to eliminate the bend of the substrate themselves may be larger than 0.3–0.4 kg g/cm$^2$.

On the contrary, if the pressure in the hot press step is too large, the uniformity of the cell gap may also decrease, because the cell gap is dependent on the positions, which is caused by the non-uniform distribution of spacers. In addition, spots due to the non-uniform distribution of spacers are generated much greatly.

Therefore, it is preferable that the pressure in the hot press step is smaller than 0.8~kg f/cm$^2$.

As a result, the pressure in the hot press step is preferably in the range of 0.4~0.55 kg f/cm$^2$.

Next, in the end seal step, a liquid crystal material is injected into the cell gap through an injection hole 60 to form a liquid crystal layer 50, and the bulging substrates 10 and 20 which are filled with the liquid crystal material are left for 3–20 hours in order to eliminate the stain of half-moon shape which is generated near the injection hole 60.

Next, as shown in FIG. 6, pressure by seal plates 12, which is connected to cylinders 13, is applied to the outer surfaces of the two substrates 10 and 20 to make substrates 10 and 20 to be flat. As shown in FIG. 7, during initial T1 time, the pressure gradually increases from P1 to P2 such that the bulging substrate 10 and 20 become flat, and the residual amount of the liquid crystal material filled in the liquid crystal cell is discharged. During the next T2 time, the residual amount of the liquid crystal material 50 filled in the liquid crystal cell is continuously discharged by maintaining the pressure P2 constantly. Next, with maintaining the pressure P2, a second sealant which can be hardened by the ultraviolet light is mixed with spacers, and is pasted in the injection hole 60. During the next T3 time, the pressure decreases from P2 to P3, and the second sealant slightly enters into the injection hole 60 due to the pressure difference between the inside and the outside of the liquid crystal display. Next, during the next T4 time, the second sealant is flattened with maintaining the pressure P3 constantly. Finally, the pressure is eliminated, and the second sealant is hardened by the ultraviolet irradiation.

At this time, it is preferable that the pressure P2 applied during the T2 time is larger than that in the hot press step by 0.1–1.0 kg f/cm$^2$, and is in the range of 0.7–1.0 kg f/cm$^2$. The desired uniform cell gap can be obtained through this step.

Furthermore, although the height difference in the substrates themselves, between the sealant and the substrates and in the sealant itself exist, the uniform cell gap can be obtained because these height differences are ineffective by using spacers 40 having larger size than the cell gap.

Next, the experiments based on the embodiment of the present invention are described.

Here, the size of substrate was 15.1", the temperature in the hot press step was 160° C. and T1/T2/T3/T4 were equal to 60/60/25/7 minutes in experiment 1 to experiment 5. A goal cell gap was 4.5 $\mu$m in experiment 1 to experiment 3, and a goal cell gap was 4.3 $\mu$m in experiments 4 and 5. Some spacers were mixed with the sealant and others are spread on the substrate in these experiments.

Experiment 1

The pressure in the hot press step was 0.6 kg f/cm$^2$, the pressures P1/P2/P3 of the end seal step were 0.1/0.5/0.3, respectively, the diameter of the spacers mixed with the sealant was 5.7 $\mu$m, and the diameter of the spacers 40 spread on the substrate was 5.0 $\mu$m. The liquid crystal cell is left for less than 3 hours.

Figure 8:
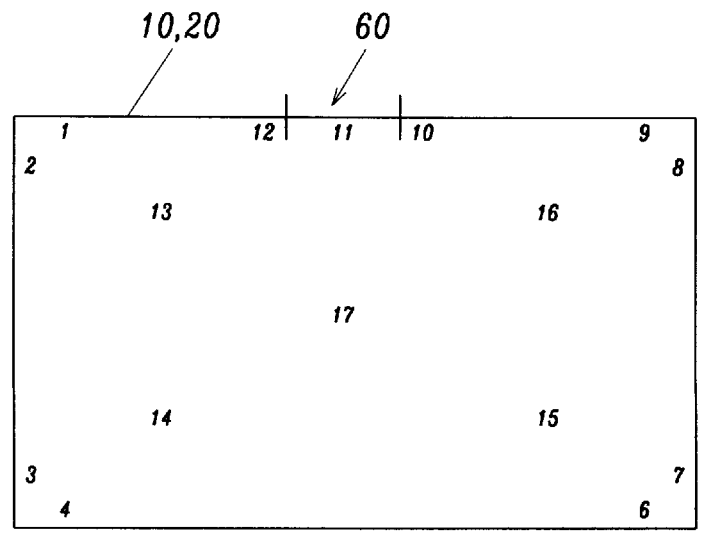
FIG. 8 is a plan view of an LCD illustrating positions where the cell gap of a liquid crystal display is measured in a first experiment.

This experiment was performed twice, and the cell gap was measured at the positions shown in FIG. 8. The measured results are tabulated in FIG. 9 and are mapped in FIG. 10.

In the first result #1, the average value AVE'G of the cell gap is 4.41 $\mu$m, its maximum value MAX is 4.56 $\mu$m, its minimum value MIN is 4.21 $\mu$m, the difference MAX-MIN between the maximum value MAX and the minimum value MIN is 0.35 $\mu$m, and the standard deviation STD is 0.1035. In the second result #2, the average value AVE'G of the cell gap is 4.40 $\mu$m, its maximum value MAX is 4.53 $\mu$m, its minimum value MIN is 4.22 $\mu$m, the difference MAX-MIN between the maximum value MAX and the minimum value MIN is 0.31 $\mu$m, and the standard deviation STD is 0.0863. If the AVE'G, MAX, MIN, MAX-MIN and STD of the two results #1 and #2 are averaged, the average value AVE of the cell gap are 4.41 $\mu$m, 4.54 $\mu$m, 4.24 $\mu$m, 0.30 $\mu$m, and 0.0904, respectively.

At the positions 1–9 near the edge of the substrates, the average values AVE1 and AVE2 of the cell gap in the first and second results #1 and #2 are 4.42 $\mu$m and 4.41 $\mu$m, respectively, the average values AVE of the cell gap at each positions are 4.48 $\mu$m, 4.38 $\mu$m, 4.45 $\mu$m, 4.45 $\mu$m, 4.41 $\mu$m, 4.35 $\mu$m, 4.24 $\mu$m, 4.49 $\mu$m, and 4.49 $\mu$m, respectively, and their average value AVE is 4.41 $\mu$m. At the positions 10–12 near the injection hole, the average values AVE1 and AVE2 of the cell gap in the first and second results #1 and #2 are 4.27 $\mu$m and 4.29 $\mu$m, respectively, the average values AVE of the cell gap at each positions are 4.25 $\mu$m, 4.31 $\mu$m, and 4.30 $\mu$m, respectively, and their average values AVE is 4.28 $\mu$m. At the inner positions 13–17, the average values AVE1 and AVE2 of the cell gap in the first and second results #1 and #2 are 4.49 $\mu$m and 4.45 $\mu$m, respectively, the average values AVE of the cell gap at each position are 4.43 $\mu$m, 4.54 $\mu$m, 4.49 $\mu$m, 4.42 $\mu$m, and 4.49 $\mu$m, respectively, and their average value AVE is 4.47 $\mu$m.

Figure 10:
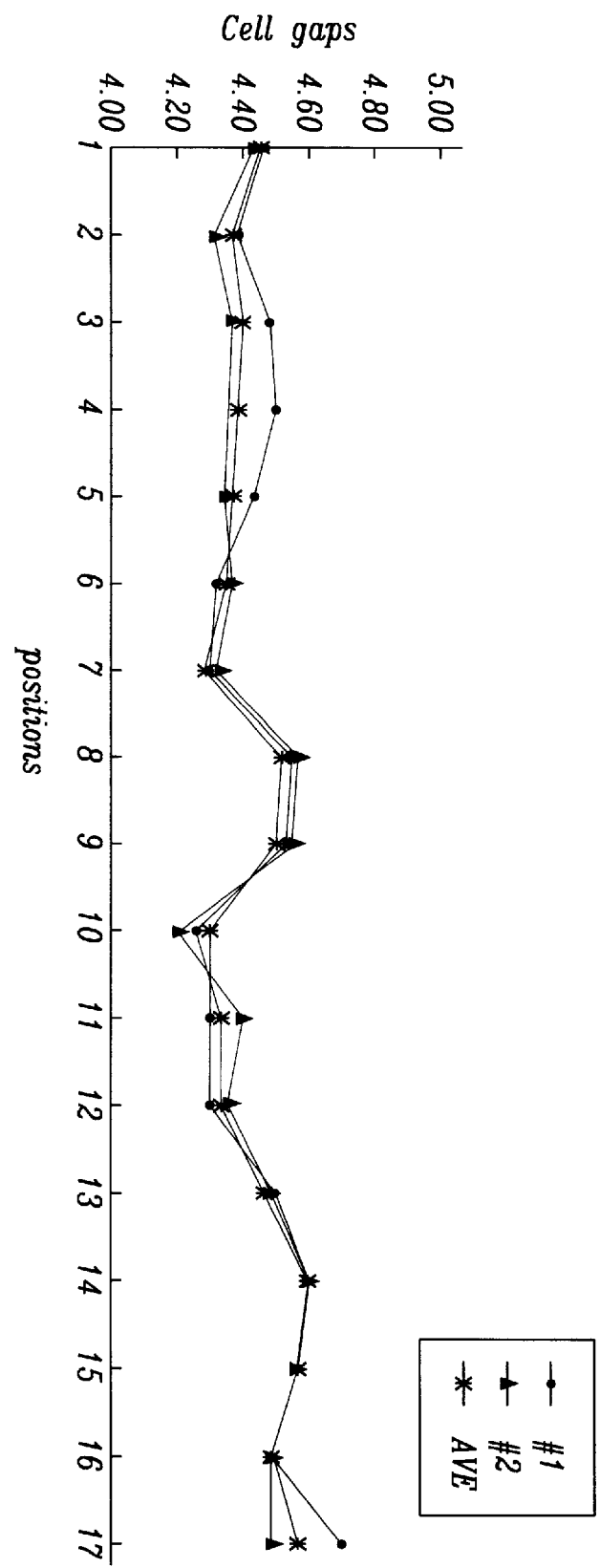

As shown in FIG. 10, the cell gap measured in the first and second results #1 and #2, and their average AVE have relatively nonuniform values in the range of 4.2–4.6 $\mu$m. That is to say, the difference MAX-MIN between the maximum value MAX and the minimum value MIN has relatively large value in the range of 0.31–0.35 $\mu$m.

Experiment 2

The pressure in the hot press step was 0.5 kg f/cm$^2$, the rest conditions of this experiment was the same as the experiment 1. Also, this experiment was performed twice, and the cell gap was measured at the positions shown in FIG. 11.

Figure 13:
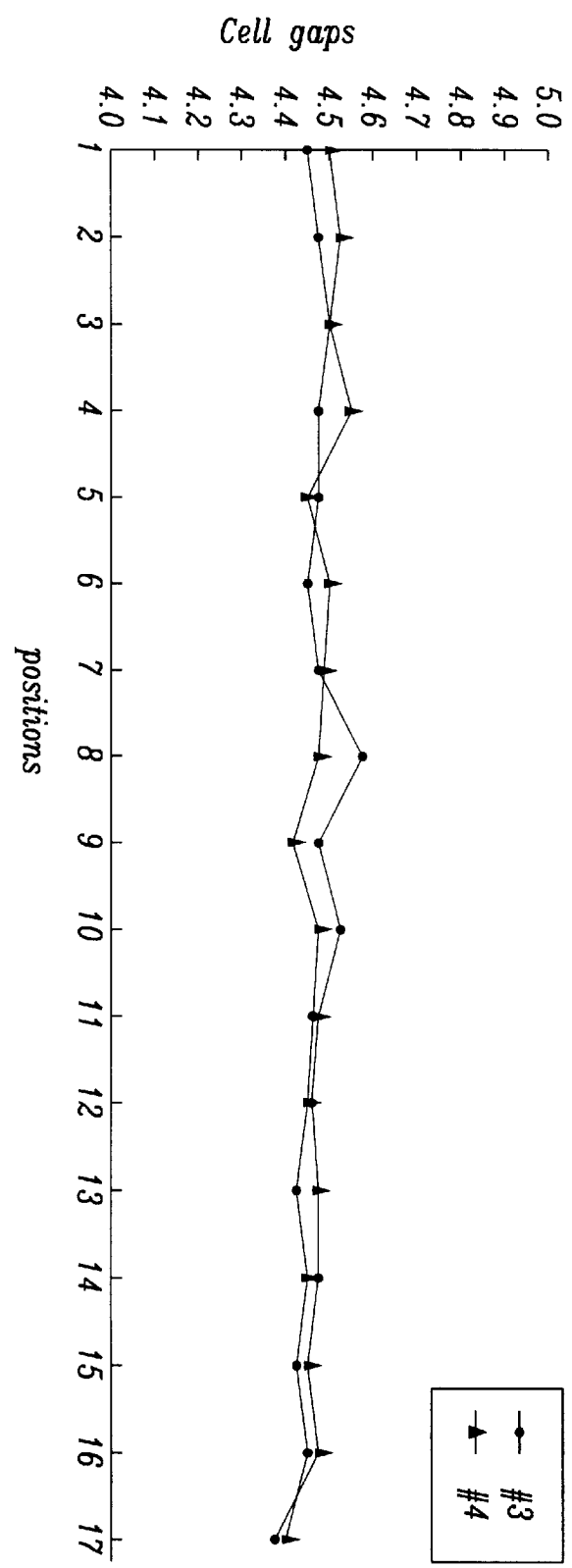

The measured results are tabulated in FIG. 12 and are mapped in FIG. 13.

In the third result #3, the average value AVE'G of the cell gap is 4.47 μm, its maximum value MAX is 4.57 μm, its minimum value MIN is 4.40 μm, the difference MAX-MIN between the maximum value MAX and the minimum value MIN is 0.17 μm, and the standard deviation STD is 0.0395. In the fourth result #4, the average value AVE'G of the cell gap is 4.47 μm, its maximum value MAX is 4.54 μm, its minimum value MIN is 4.39 μm, the difference MAX-MIN between maximum value MAX and the minimum value MIN is 0.15 μm, and the standard deviation STD is 0.0371.

At the positions 1–8 near the edge of the substrates, the average values AVE3 and AVE4 of the cell gap in the third and the fourth results #3 and #4 are 4.49 μm and 4.50 μm, respectively. At the inner positions 9–17, the average values AVE3 and AVE4 of the cell gap in the third and the fourth results #3 and #4 and 4.45 μm, respectively.

As shown in FIG. 13, the cell gap measured in the third and the fourth results #3 and #4 is in the range of 4.4–4.6 μm. That is to say, if the pressure in the hot press step is dropped from 0.6 kg f/cm² to 0.5 kg f/cm², the cell gap becomes more uniform and the spots resulted from the nonuniform distribution of spacers is considerably reduced.

Experiment 3

This experiment was performed twice.

In the fifth condition, the pressure in the hot press step was 0.6 kg f/cm², the pressures P1/P2/P3 in the end seal step were 0.1/0.5/0.3, respectively, the diameter of the spacers mixed with the sealant was 5.7 μm, and the diameter of the spacers 40 spread on the display region of the substrate was 5.25 μm. The liquid crystal cell was left for less than 3 hours.

In the sixth condition, the pressure in the hot press step was 0.54 kg f/cm², the pressures P1/P2/P3 in the end seal step were 0.1/0.9/0.8, respectively, the diameter of the spacers mixed with the sealant was 5.7 μm, and the diameter of the spacers 40 spread on the substrate was 5.25 μm. Here, the liquid crystal cell was left for 3–20 hours.

The cell gap was measured at the same position as the experiment 2.

Figure 15:
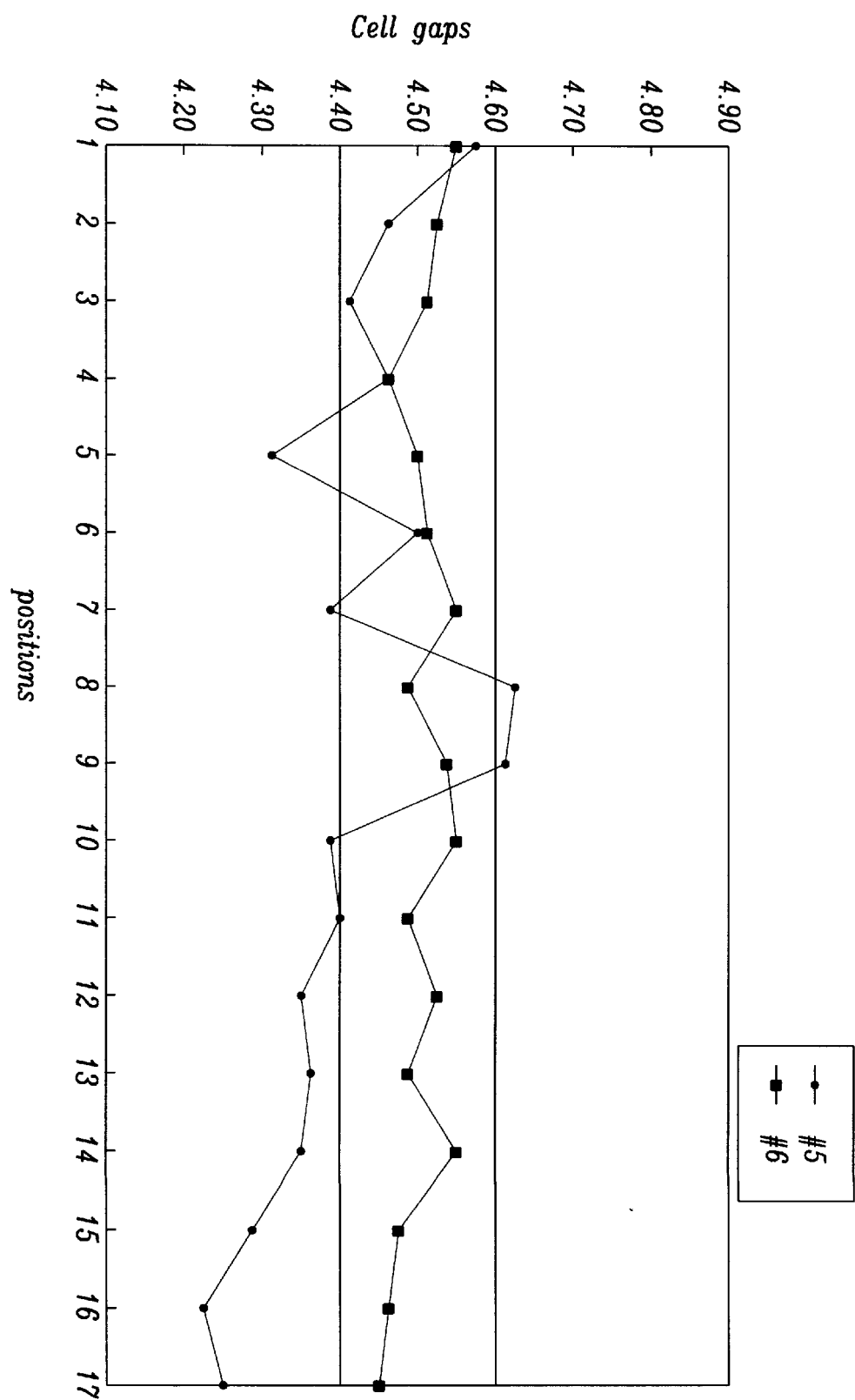

The measured results are tabulated in FIG. 14 and are mapped in FIG. 15.

As shown in FIGS. 14 and 15, the cell gap of the sixth result #6 has uniform value in the range of 4.5±0.1 μm, but the cell gap of the fifth result #5 is relatively nonuniform.

Experiment 4

The pressure in the hot press step was 0.5 kg f/cm², the pressures P1/P2/P3 in the end seal step were 0.7/1.0/0.9, respectively, and the liquid crystal cell was left for 3–20 hours. The rest of the process conditions were the same as Experiment 2.

Figure 11:
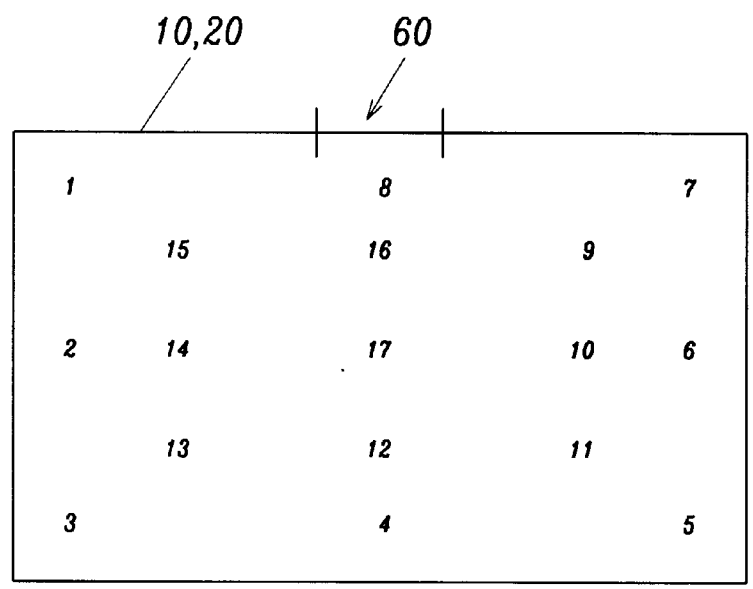
FIG. 11 is a plan view of an LCD illustrating positions where the cell gap of a liquid crystal display is measured in a second experiment.

The cell gap was measured at the positions shown in FIG. 11, and this experiment was performed five times. The measured results are tabulated in FIG. 16 and are mapped in FIG. 17.

In the seventh result #7, the average value AVE'G of the cell gap is 4.26 μm, its maximum value MAX is 4.33 μm, its minimum value MIN is 4.18 μm. The difference MAX-MIN between the maximum value MAX and the minimum value MIN is 0.15 μm, and the standard deviation STD is 0.0400. In the eighth result #8, the average value AVE'G of the cell gap is 4.24 μm, its maximum value MAX is 4.33 μm, its minimum value MIN is 4.13 μm, the difference MAX-MIN between the maximum value MAX and the minimum value MIN is 0.20 μm, and the standard deviation STD is 0.0469. In the ninth result #9, the average value AVE'G of the cell gap is 4.25 μm, its maximum value MAX is 4.33 μm, its minimum value MIN is 4.17 μm, the difference MAX-MIN between the maximum value MAX and the minimum value MIN is 0.16 μm, and the standard deviation STD is 0.0412. In the tenth result #10, the average value AVE'G of the cell gap is 4.34 μm, its maximum value MAX is 4.42 μm, its minimum value MIN is 4.26 μm, the difference MAX-MIN between the maximum value MAX and the minimum value MIN is 0.16 μm, the standard deviation STD is 0.0409. In the eleventh result #11, the average value AVE'G of the cell gaps is 4.28 μm, its maximum value MAX is 4.38 μm, its minimum value MIN is 4.20 μm, the difference MAX-MIN between the maximum value MAX and the minimum value MIN is 0.18 μm, and the standard deviation STD is 0.0434.

At the positions 1–8 near edge of the substrates, the average values AVE of the cell gaps in the seventh result #7 to the eleventh result #11 are 4.27 μm, 4.27 μm, 4.27 μm, 4.35 μm, and 4.30 μm, respectively. At the inner positions 9–17, the average values AVE of the cell gaps in the seventh result #7 to the eleventh result #11 are 4.24 μm, 4.23 μm, 4.22 μm, 4.32 μm, and 4.27 μm, respectively.

Figure 17:
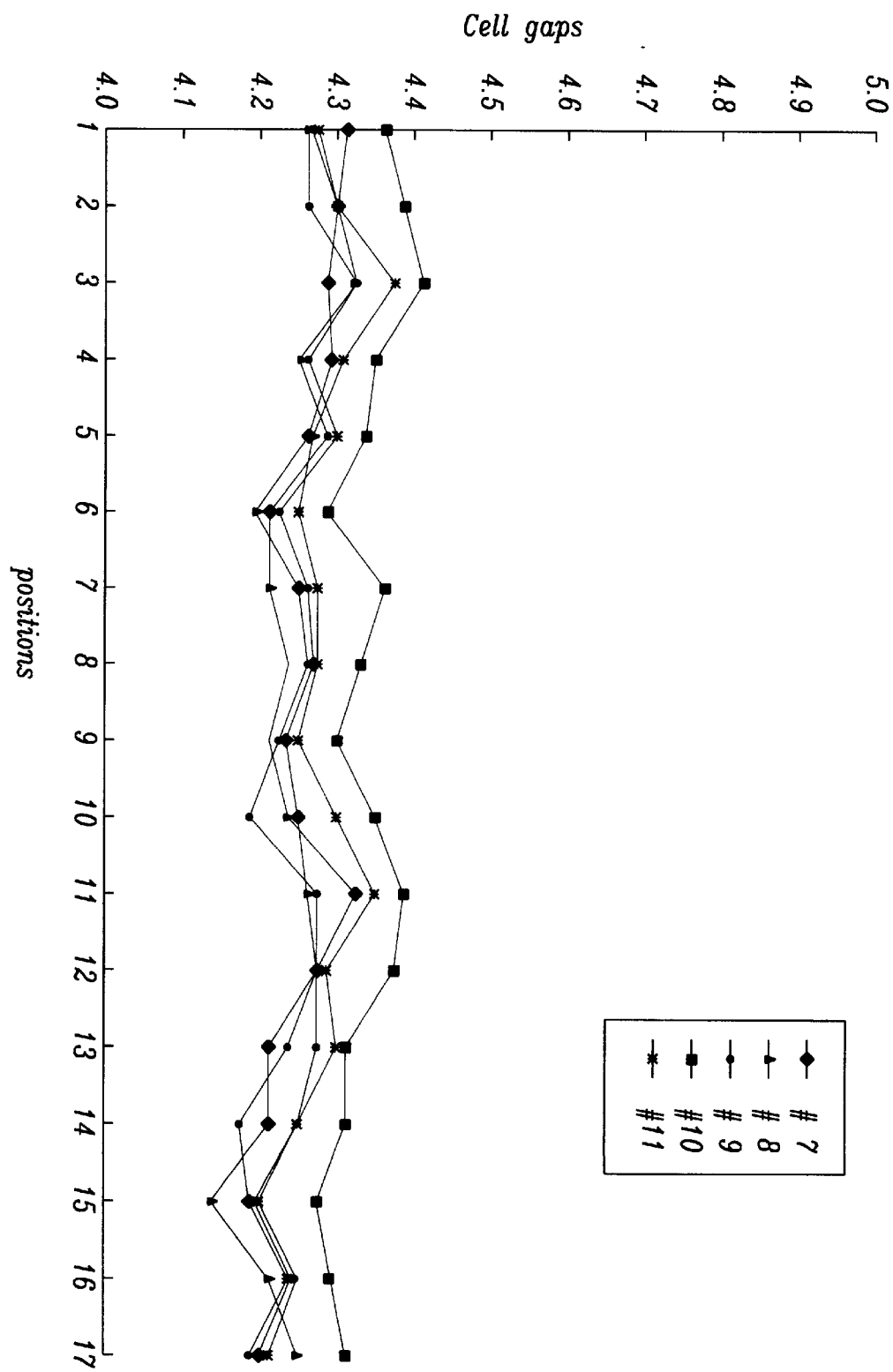

As shown in FIG. 17, the cell gap is relatively uniform. That is to say, the difference MAX-MIN between the maximum and the minimum values MAX and MIN has small value in the range of 0.15–0.20 μm as shown in FIG. 15.

Experiment 5

This experiment was performed twice.

In the twelfth condition, the pressure in the hot press step was 0.6 kg f/cm², the pressures P1/P2/P3 in the end seal step were 0.1/0.5/0.3, respectively, the diameter of the spacers mixed with the sealant was 5.7 μm, and the diameter of the spacers spread on display region of the substrate was 5.0 μm. The liquid crystal cell was left for less than 3 hours.

The thirteenth condition was the same as the sixth condition of Experiment 3, the diameter of the spacers spread on the display region was 5 μm.

Figure 19:
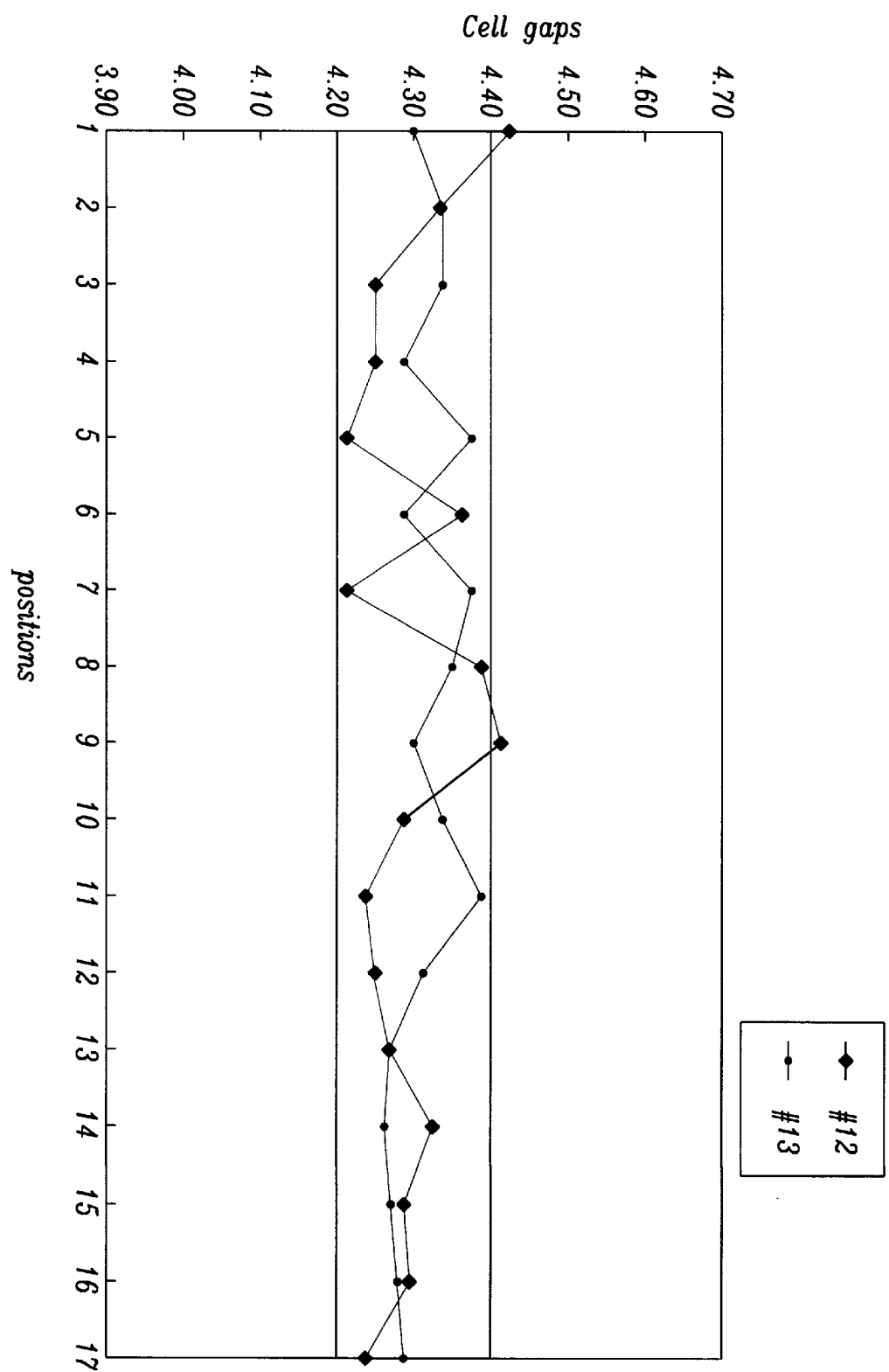

The measured results are tabulated in FIG. 18 and are mapped in FIG. 19.

As shown in FIG. 18 and FIG. 19, the cell gap has uniform value in the range of 4.3±0.1 μm in the thirteenth result #13, but the cell gap has relatively nonuniform value beyond 4.3±0.1 μm in the twelfth result #12. The standard deviation of the thirteenth result #13 is smaller than the standard deviation of the twelfth result #12.

In the manufacturing method of LCD according to the invention, the cell gap of the liquid crystal display may be uniform by applying the stronger pressure in the end seal step than that in the hot press step. The uniform cell gap is yield by applying the smaller pressure than the conventional method, and spreading spacers having the larger diameter than the cell gap. Furthermore, the cell gap of the liquid crystal display near the injection hole becomes uniform and the spots are eliminated by leaving the liquid crystal cell for a time before filling up the injection hole.

That which is claimed is:

1. A method of manufacturing a liquid crystal display, comprising the steps of:

(a) positioning a first substrate layer having inner and outer surfaces to overlay an opposing second substrate layer having inner and outer surfaces such that the first and second substrate layer inner surfaces face each other, each of the inner surfaces having a perimeter portion therearound;

(b) applying a first sealant to at least one of the perimeter portions of said first and second substrate layers such that the sealant forms an injection opening along the perimeter portion;

(c) compressing the outer surfaces of said first and second substrates after said applying step at a first pressure to structurally attach said sealant and substrates together such that they define a cell cavity therebetween;

(d) injecting a liquid crystal material through the injection opening into the cell cavity at a pressure sufficient to expand the cell such that the first and second substrate layers take a non-planar configuration;

(e) compressing the first and second substrate layers to a substantially planar configuration thereby expelling a residual amount of the injected liquid crystal material from the cell cavity out of the injection opening;

(f) applying a second sealant proximate to the injection opening to position sealant material for an end seal thereat; and (g) compressing said first and second substrates at a second pressure during step (e) greater than the first pressure of step (c).

2. A method according to claim 1, wherein said step (e) comprises compressing the substrate layers by gradually increasing the external pressure from an initial end seal pressure (P1) to a second end seal pressure (P2) during a first time period (T1) and maintaining the second seal pressure (P2) for a second time period (T2), and wherein (P2) is less than the first pressure introduced during said first compressing step.

3. A method according to claim 2, wherein said applying step is performed after said second time period (T2).

4. A method according to claim 3, wherein during said second applying step, the pressure introduced to the substrate layers is maintained at about the second seal pressure (P2).

5. A method according to claim 4, wherein after said second applying step, the pressure introduced onto the substrate layers is decreased to a third pressure (P3) for a third time period (T3).

6. A method according to claim 5, further comprising the steps of removing the externally applied pressure and exposing the second sealant to a light source to cure the sealant to thereby form the end seal.

7. A method according to claim 6, wherein said step (c) comprises concurrently heating the substrate layers.

8. A method according to claim 1, further comprising the step of positioning a plurality of spacers such that they reside in the cell cavity and contact at least one of the inner surfaces of the first and second substrates.

9. A method according to claim 8, the cell cavity having a sealed gap width, wherein said spacers have a diameter which is greater than the sealed width of the cell cavity.

10. A method according to claim 9, wherein said spacers are 10–30% larger than the sealed width of the cell cavity.

11. A method according to claim 8, wherein said compressing step (c) comprises pressing the substrate layers one toward the other such that they contact opposing sides of said spacers in a manner which deforms the spacers.

12. A method according to claim 1, wherein after said injecting step said step (e) is delayed for a predetermined period after step (d).

13. A method according to claim 12, wherein said delay is from about 3–20 hours.

14. A method according to claim 12, wherein said delay is from about 3–10 hours.

15. A method according to claim 1, wherein the second pressure is about 0.1–1.0 kg/cm$^2$ greater than the first pressure.

16. A method according to claim 15, wherein the second pressure is in the range of about 0.7–1.0 kg/cm$^2$.

17. A method according to claim 1, wherein the first pressure is in the range of about 0.3–0.8 kg/cm$^2$.

18. A method according to claim 1, wherein the first pressure is in the range of about 0.4–0.55 kg/cm$^2$.

19. A method according to claim 18, wherein after said injecting step, step (e) is delayed for a predetermined period.

20. A method of forming a cell gap in a liquid crystal display, comprising the steps of:

applying a first sealant to an outer perimeter portion of a first substrate layer such that the first sealant forms an injection opening;

positioning a second substrate layer to overlay said first substrate layer and first sealant;

disposing a plurality of spacers on at least one of the first and second substrates;

compressing each of the substrate layers toward the other with an external force and heat thereon to structurally attach the substrates together, thereby forming a cell cavity defined by the first substrate, the first sealant, and the second substrate;

applying a second sealant proximate to the injection opening;

introducing a second pressure onto the first and second substrates to position the second sealant such that it travels into the injection opening, wherein the second pressure is about 0.1–1.0 kg/cm$^2$ greater than the first pressure; and curing said second sealant to seal the cell cavity.

21. A method according to claim 20, wherein the compressing step external force exerts a first pressure of about 0.4–0.55 kg/cm$^2$, and wherein the second pressure is in the range of about 0.7–1.0 kg/cm$^1$.

22. A method according to claim 20, the cell cavity having a sealed gap width, wherein said spacers have a diameter which is greater than the sealed gap width of the cell cavity.

23. A method according to claim 20, wherein said spacers are sized to be 10–30% larger than the sealed width of the cell cavity.

24. A method according to claim 20, further comprising the step of injecting a quantity of liquid crystal material into the cell gap through the injection opening prior to said second applying step.

25. A method according to claim 24, further comprising the step of delaying the introduction of the second pressure after said injecting step.

26. A method according to claim 25, wherein the delay is from about 3–20 hours.

27. A method for fabricating a liquid crystal display, comprising the steps of:

applying a first sealant on at least one of a first and second substrate;

hot-pressing the first and second substrates together such that the first sealant is intermediate the first and second substrates, wherein the first and second substrates and sealant attach to form a cell cavity with an injection opening therebetween;

injecting a quantity of liquid crystal material into the injection opening;

sealing the injection opening with a second sealant by introducing a second pressure onto the first and second substrates, thereby facilitating the proper positioning of the second sealant such that it closes the injection opening; and delaying introducing said second pressure by about 3–20 hours from said injecting step.

28. A method according to claim 27, wherein the second pressure is introduced at about 3–10 hours after said injecting step.

29. A method according to claim 27, wherein the first pressure is in the range of about 0.3–0.8 kg/cm$^2$.

30. A method according to claim 29, wherein the second pressure is about 0.1–1.0 kg/cm$^2$ larger than the first pressure.

31. A method according to claim 30, further comprising the step of disposing a plurality of spacers onto one of the first and second substrates.

32. A method according to claim 31, wherein the spacers have a diameter and the cell cavity has a predetermined optimum gap value, and wherein the diameter of the spacers is about 10–30% larger than the optimum gap value.

33. A method of fabricating a liquid crystal display including first and second substrates, comprising the steps of:

applying a first sealant to form a continuous trail along an outer perimeter portion at least one of a first and second substrate, the trail defining a single injection opening formed therealong;

disposing a plurality of spacers on at least one of the first and second substrates such that they reside inside the perimeter area defined by the sealant trail;

securing the substrates together with the first sealant to define a cell cavity with internally positioned spacers;

injecting a quantity of liquid crystal display material into the injection opening;

applying a second sealant proximate to the injection opening after a delay period of at least about three hours after said injecting step, wherein the second sealant is formulated as a paste-like material;

introducing a pressure differential across the second sealant causing the second sealant to migrate into the injection opening; and forcing the first and second substrates to compress the spacers such that they deform by about 10–30% from their static configuration.

34. A method of fabricating a liquid crystal display including first and second substrates, comprising the steps of:

applying a first sealant to form a continuous trail along an outer perimeter portion at least one of a first and second substrate, the trail having an injection opening formed therealong;

disposing a plurality of spacers on at least one of the first and second substrates such that they reside inside the perimeter area defined by the sealant trail;

securing the substrates together with the first sealant to define a cell cavity with internally positioned spacers;

injecting a quantity of liquid crystal display material into the injection opening;

applying a second sealant proximate to the injection opening after said injecting step; and forcing the first and second substrates to compress the spacers such that they deform by about 10–30% from their static configuration;

wherein said securing step is performed by hot pressing the first and second substrates together, the hot-pressing having an associated first pressure, and wherein said forcing step employs a pressure about 0.1–1.0 kg/cm$^2$ greater than the first pressure of said securing step.

35. A liquid crystal display, comprising:

a first substrate layer;

a second substrate layer positioned opposing said first substrate layer, said first and second substrates structurally connected such that they define a cell cavity therebetween;

a liquid crystal layer positioned intermediate said first and second substrate layers; and a plurality of compressed spacers positioned in said cell cavity such that they contact said first and second substrates, wherein said compressed spacers are sized and configured such that they are compressed in said cell cavity by about 10–30% relative to their uncompressed configurations, wherein said first and second substrate layers comprise inner surfaces positioned to face each other, said display further comprising a sealant positioned about a perimeter portion of at least one of said inner surfaces to join said first and second substrates theretogether, and wherein said perimeter sealant is configured to define a single opening therein, said single opening configured and sized for injection of a liquid crystal material therethrough into a cavity defined between said first and second substrate layers and said perimeter seal, and wherein said single opening is closed by a quantity of a second sealant disposed therein, said second sealant having a hardened condition securing it to said first and second substrates associated with exposure to an ultraviolet source.

36. A liquid crystal display according to claim 35, wherein said spacers are cylindrical.

37. A liquid crystal display according to claim 35, wherein said compressed spacers are sized and configured such that they are compressed in said cell cavity by at least about 20% relative to their uncompressed configurations.

38. A liquid crystal display according to claim 35, wherein said compressed spacers are sized and configured such that they are compressed in said cell cavity by about 30% relative to their uncompressed configurations.

* * * * *